United States Patent [19]

Silvestri

[11] 4,187,740
[45] Feb. 12, 1980

[54] EPICYCLIC GEAR TRAIN PLANET CARRIER SYSTEM

[76] Inventor: Giovanni J. Silvestri, 4 Meadowbrook Dr., Barrington, R.I. 02806

[21] Appl. No.: 798,066

[22] Filed: May 18, 1977

[51] Int. Cl.² .......................... F16H 1/28; F16H 3/44
[52] U.S. Cl. ..................................... 74/750 R; 74/801
[58] Field of Search .............................. 74/801, 750 R

[56] References Cited

U.S. PATENT DOCUMENTS

| 2,487,387 | 11/1949 | Sears et al. | 74/750 R |
|---|---|---|---|
| 2,591,743 | 4/1952 | Thompson | 74/801 |
| 2,703,021 | 3/1955 | Stoeckicht | 74/801 |
| 3,473,416 | 10/1969 | Pope et al. | 74/801 |
| 3,527,121 | 9/1970 | Moore | 74/801 |
| 3,741,041 | 6/1973 | Boor | 74/801 |
| 3,939,736 | 2/1976 | Morin | 74/801 |

*Primary Examiner*—C. J. Husar
*Assistant Examiner*—David C. Reichard
*Attorney, Agent, or Firm*—Richard S. Sciascia; Arthur A. McGill; Prithvi C. Lall

[57] ABSTRACT

A gear planet carrier assembly which provides accurate alignment of multi-planet clusters of gears relative to a sun gear and a ring gear in a dense epicyclic multiple branch system of a double reduction gear system while insuring torsional and lateral stiffness. Planet carrier assembly is made of a light material to keep the overall weight and inertia of the system low.

5 Claims, 4 Drawing Figures

EPICYCLIC GEAR TRAIN PLANET CARRIER SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This patent application is co-pending with my eight other patent applications having Ser. Nos. 798,059; 798,060; 798,061 (now U.S. Pat. No. 4,095,323); 798,062 (now U.S. Pat. No. 4,083,094); 798,063; 798,064 and 798,065 and having the same filing date of May 18, 1977, relating to a high pressure air turbine-gear train assembly describing and claiming various aspects thereof.

This invention relates to a gear train system and more particularly to a low weight, high strength, torsionally and laterally stiff epicyclic gear planet carrier assembly.

When power is transmitted between two stages of any parallel or branched gear system; including an epicyclic, star or parallel arrangement; of more than one stage, there is a problem as to keeping the axes of all gears parallel under heavy torque loads. Furthermore, there is a need for having a structure of minimum weight in order to minimize the dynamic loading of the system. It is thus desirable in such a gear train system to keep the weight of the system to be as low as possible and particularly to have a planet carrier assembly which has low weight and has high strength and is torsionally and laterally stiff.

SUMMARY OF THE INVENTION

The planet carrier assembly according to the teachings of subject invention is a bridge member which is made of a cylinder of heavy wall of a lightweight metal counterbored to have three pairs of holes, any two pairs of the three pairs of holes are preferably at 120 degrees interval at both ends. The resulting structure when bolted to the end plates exhibits high torsional and lateral inertia and bearing diameters are line bored in the assembled state.

An object of subject invention is to have a planet carrier assembly of a gear train system which insures perfect alignment of the gears.

Another object of subject invention is to have a planet carrier assembly which insures positional accuracy for good load distribution along the faces of the gear teeth.

Still another object of subject invention is to have a planet carrier system which is torsionally and laterally rigid.

Other objects, advantages and novel features of this invention will become apparent from the following detailed description of the invention when considered in conjunction with the accompanying drawings wherein:

DESCRIPTION OF A PREFERRED EMBODIMENT

Figure 1:
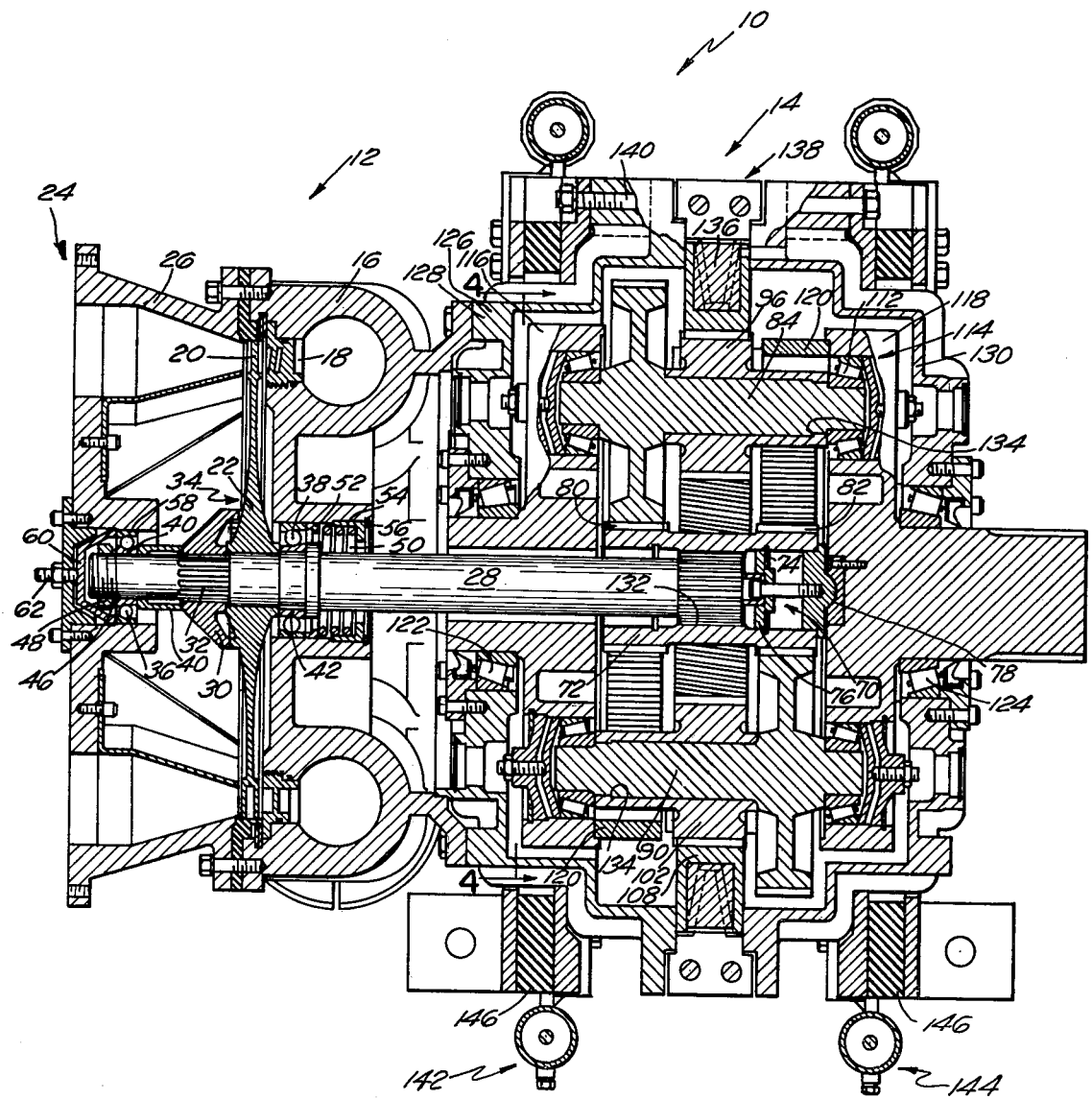
FIG. 1 is a multi-cross sectional view of a high pressure air turbine-gear train system using a planet carrier built according to the teachings of subject invention.

Referring to the drawings wherein like reference characters designate like parts throught the several views, and more particularly to FIG. 1 thereof, a multi-cross sectional view of a high pressure air turbine-gear train assembly using a planet carrier built according to the teachings of subject invention is shown.

Figure 2:
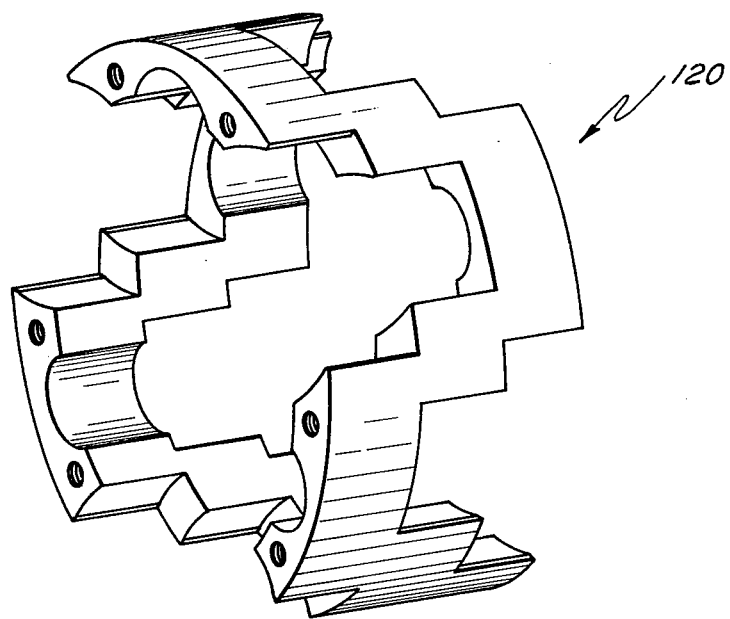
FIG. 2 is an isometric view of the planet bridge member.

As shown in FIGS. 1 and 2 the planet carrier assembly supports six planet cluster gears made up of a first stage gears 84, 86, 88, 90, 92 and 94 and second stage pinions 96, 98, 100, 102, 104 and 106 as shown and described in one of my other co-pending patent applications Ser. No. 798,064 and having filing date of May 18, 1977.

Figure 4:
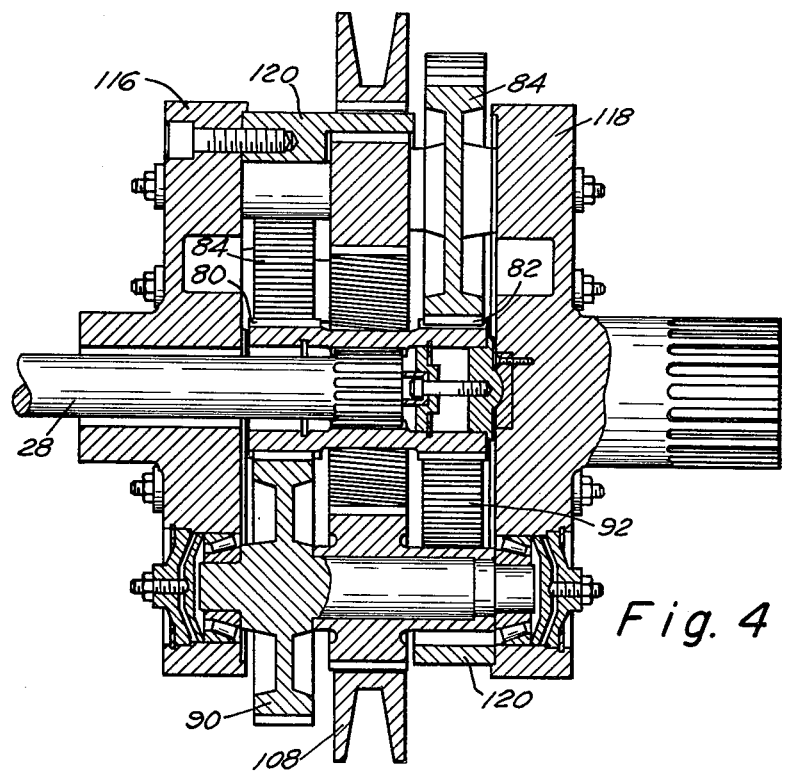
FIG. 4 is a cross section of FIG. 3 taken along line 4—4.
Figure 3:
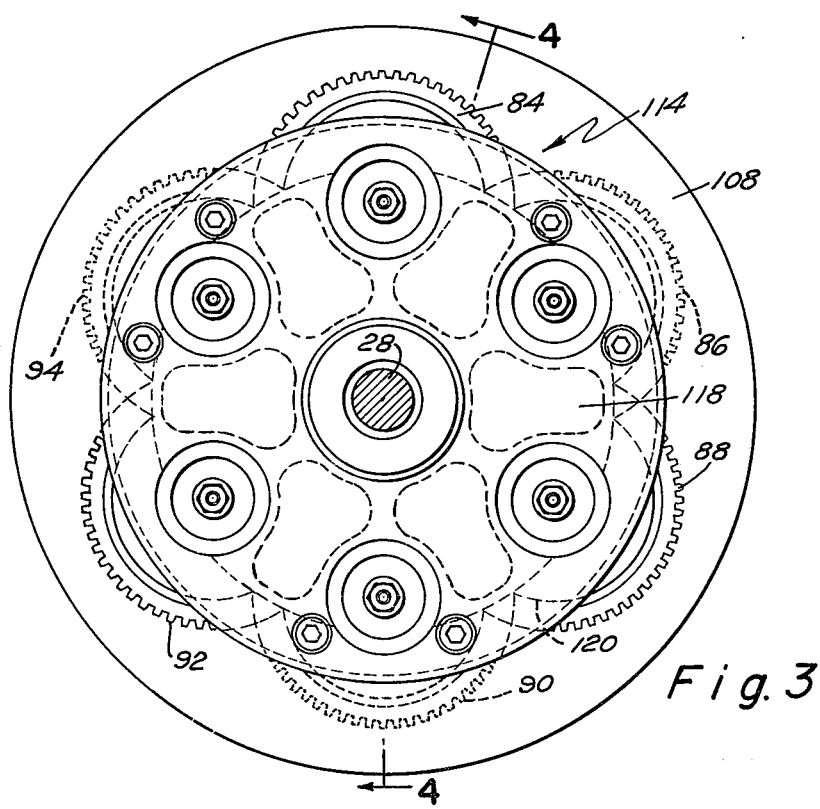
FIG. 3 is an end view of the planet carrier of FIG. 1.

The planet carrier assembly is made of elements 116, 118 and 120 as shown in FIGS. 1 and 4. Elements 116 and 118 are the input and output planet carrier bearing plates respectively and element 120 is the planet bridge member. Item 120 is more clearly shown in FIG. 2. Various elements as mentioned above are fastened together using screws, a novel feature of this assembly is principally bridge member 120 which allows mirror image assembly of two sets, each set having three planet carrier clusters. The bridge member 120 is simply made of a heavy wall lightweight metal cylinder counterbored to two diameters preferably at 120 degree interval on both ends. The resulting structure when bolted to elements 116 and 118 of FIG. 1 exhibits high torsional and lateral stiffness. The bearing diameters are line bored in the assembled state to assure accurate positioning. As shown in FIG. 2, the planet carrier essentially is a cylindrical piece which has been cut to fit the planet gear bearings and has three pairs of holes on both faces of the carrier so as to mount endplates 116 and 118 to form the carrier assembly. Two pairs of the bolts using two pairs of the holes in the carrier 120 are shown clearly in FIG. 4. For providing strength and balance to the planet carrier assembly, the three pairs of holes on planet carrier 120 are counterbored in carrier 120 preferably at 120 degree intervals. The structure as outlined above insures perfect alignment, and positional accuracy for good load distribution along gear tooth faces and is torsionally and laterally rigid. It is preferably made of aluminum and provides minimum weight and is dynamically and statically balanced on bearings 122 and 124 as shown in FIG. 1, to reduce disturbing forces.

Briefly stated, a planet carrier assembly is preferably made of aluminum which provides accurate alignment of multi-planet clusters relative to a sun gear and ring gear in a dense epicyclic multiple branch gear train system of double reduction while insuring that torsional and lateral stiffness and minimum deflections between the planet bearing support members of the planet carrier.

Obviously, many modifications and variations of the present invention are possible in the light of the above teachings. As an example, the material out of which the planet carrier is made of can vary without deviating from the present invention. It is therefore understood that within the scope of the appended claims the invention may be practiced otherwise than as specifically described.

I claim:

1. A planet carrier system in an epicyclic gear train assembly including two planet sets, each of the two planet sets having three planet clusters, which comprises:

an input planet carrier bearing plate for supporting one end of the first gear of each of said planet clusters, said input planet carrier bearing plate having a first plurality of projections and slots and further having a first three pairs of threaded openings adjacent outer edge thereof, each pair of said first three pairs of threaded openings being 120 degrees apart from the remaining two pairs thereof;

an output planet carrier bearing plate for supporting the opposite end of the first gear of each of said planet clusters, said output planet carrier bearing plate having a second plurality of projections and slots and further having a second three pairs of threaded openings adjacent outer edge thereof, each pair of said second three pairs of threaded openings being 120 degrees apart from the remaining two pairs thereof and said second three pairs of threaded openings being adapted to be aligned with the corresponding members of said first three pairs of threaded openings; and a generally cylindrical bridge member having a first end and a second end, said first end having a third plurality of projections and slots being adapted to be demountably engaged with the corresponding members of said first plurality of projections and slots on said input planet carrier bearing plate and said second end having a fourth plurality of projections and slots being adapted to be demountably engaged with the corresponding members of said second plurality of projections and slots on said output planet carrier bearing plate, said bridge member further having a third three pairs of counterbored threaded openings on the first end thereof and a fourth three pairs of counterbored threaded openings at the second end thereof, each pair of said third plurality of counterbored threaded openings being 120 degrees apart from the remaining two pairs thereof and each pair of said fourth plurality of counterbored threaded openings being 120 degrees apart from the remaining two pairs thereof, and said first and second three pairs of threaded openings respectively on said input planet carrier bearing plate and on said output planet carrier bearing plate and said third and fourth three pairs of threaded openings respectively on the first end and second end of said bridge member being adapted to be aligned and mutually engaged for accurate positioning so as to form the planet carrier system.

2. The planet carrier system of claim 1 wherein said first and second ends of said bridge member are symmetrical relative to said input planet carrier bearing plate and said output planet carrier bearing plate.

3. The planet carrier system of claim 2 wherein said bridge member is made of a relatively light material.

4. The planet carrier system of claim 2 wherein said bridge member is made of aluminum.

5. The planet carrier system of claim 2 wherein said third and fourth three pairs of threaded openings are line bored holes for accurate positioning of said bridge member, said input planet carrier bearing plate and output planet carrier bearing plate to form the planet carrier.

* * * * *